(12) United States Patent
Benco et al.

(10) Patent No.: US 7,224,974 B2
(45) Date of Patent: May 29, 2007

(54) NETWORK SUPPORT FOR PER USER PACKET DATA THROUGHPUT

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 221 days.

(21) Appl. No.: 10/739,560

(22) Filed: Dec. 18, 2003

(65) Prior Publication Data

US 2005/0148335 A1    Jul. 7, 2005

(51) Int. Cl.
*H04Q 7/20*    (2006.01)
(52) U.S. Cl. ............... 455/445; 455/406; 455/412; 705/40
(58) Field of Classification Search .......... 455/406, 455/408, 412, 412.1, 466, 413; 379/265.01; 370/441; 705/40
See application file for complete search history.

(56) References Cited

U.S. PATENT DOCUMENTS 5,291,543 A * 3/1994 Freese et al. ............ 455/408
5,854,975 A * 12/1998 Fougnies et al. .......... 455/408
6,173,171 B1 * 1/2001 Plush et al. .............. 455/408
6,885,857 B1 * 4/2005 Hanson .................... 455/406
2002/0068546 A1 * 6/2002 Plush et al. .............. 455/406
2002/0178118 A1 * 11/2002 Hamilton et al. ........... 705/40
2003/0153302 A1 * 8/2003 Lewis et al. .............. 455/412
2003/0223450 A1 * 12/2003 Bender et al. ............ 370/441
2004/0082315 A1 * 4/2004 Aoki .................... 455/412.1

* cited by examiner

*Primary Examiner*—Jean Gelin
*Assistant Examiner*—Michael Vu

(57) ABSTRACT

One embodiment of the present method is for a method that provides packet data throughput information on a per user basis for at least one mobile terminal of a plurality of mobile terminals operatively connected to a communication network. In this embodiment the method may have the steps of: collecting, by the telecommunication network, usage data associated with packet data calls for the respective mobile terminal and forming data throughput information from the usage data; storing, by the telecommunication network, the data throughput information in a storage; and sending, from the communication network to the respective mobile terminal, the data throughput information. The system implements the method.

14 Claims, 4 Drawing Sheets

NETWORK SUPPORT FOR PER USER PACKET DATA THROUGHPUT

TECHNICAL FIELD

The present invention relates to wireless telephony in general, and, more particularly, to a method and system that provides packet data throughput information on a per user basis for at least one mobile terminal of a plurality of mobile terminals operatively connected to a communication network.

BACKGROUND OF THE INVENTION

The growth of communication systems has resulted in increased system capacity and flexibility. Early cellular communication systems provided services using circuit-switched technologies. Now, however, mobile calls may be routed in a circuit-switched fashion, a packet-switched fashion, or some hybrid thereof. Moreover, it has become increasingly desirable to couple and integrate mobile cellular telephone networks, for instance a GSM network, to Internet protocol (IP) networks for call routing purposes. The routing of voice calls over IP networks is frequently termed "voice over IP" (VoIP).

Packet-switched technology, which may be connection-oriented (e.g., X.25) or "connectionless" as in IP, does not require the set-up and tear-down of a physical connection as in circuit-switched technology. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers," are stationed between the communicating end-systems to make decisions about the most appropriate route to take on a per packet basis.

In packet data communication schemes, access to the system is provided on a random basis using a packet data scheduler disposed in the fixed part of the system. Once a mobile station has made a successful random access, and is therefore active, it is scheduled by the system to transfer packets on a radio channel. The scheduling of transmission resources by the system for the active mobile station provides the mobile station with a reserved access, as opposed to a random access. The scheduling can be carried out on basis of the mobile's Quality of Service (QoS) or other widely known methods. With the introduction of new services or applications over packet data systems, for example real time (RT) services such as VoIP, there will be a large variety of Quality of Service (QoS) demands on the network. Certain users, for example, those utilizing real time voice applications will have a very high demand for the availability of transmission resources, whereas users, for example, who transmit short messages or electronic mail, will be satisfied with a lower availability of transmission resources.

As more and more mobile subscribers use packet data service through their mobile devices, i.e. browsing Internet, and downloading files, there is a need for the users to know the actual data throughput (amount of data) that they have experienced either everyday or upon request. This information not only provides data usage information to the end users but also serves as an index for mobile subscribers to understand the data activity periodically, which may trigger upgrading to another level of service, i.e. higher data rate, for heavy data usage subscribers. Also letting the users know their data throughput allows them to have some evidence for complaining to their service provider if their average rate does not meet the rate of the service they subscribe to.

Therefore, there is a need in the prior art for a method and system that provides packet data throughput information on a per user basis.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms, one embodiment of the present method is for a method that provides packet data throughput information on a per user basis for at least one mobile terminal of a plurality mobile terminals operatively connected to a communication network. In this embodiment the method may have the steps of: collecting, by the telecommunication network, usage data associated with packet data calls for the respective mobile terminal and forming data throughput information from the usage data; storing, by the telecommunication network, the data throughput information in a storage; and sending, from the communication network to the respective mobile terminal, the data throughput information.

Also, in general terms, one embodiment of the present system is for a system that provides packet data throughput information on a per user basis for at least one mobile terminal of a plurality mobile terminals operatively connected to a communication network. In this embodiment the system may have: at least one send parameter defined by a respective mobile terminal of a plurality of mobile terminals, the send parameter being communicated from the respective mobile terminal to the communication network; collection module in the telecommunication network, the collection module collecting, in response to the send parameter, respective usage data associated with packet data calls for a respective mobile terminal and forming respective data throughput information from the usage data; and a storage in the telecommunication network, the respective data throughput information being stored in the storage. The respective data throughput information is sent from the communication network to the mobile terminal as a function of the send parameter.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

Methodologies of the present method and system may include at least one of: for the communication network to separate the data activity among different users (mobile terminals); for the communication network to calculate the data throughput information on a per user basis; for the communication network to support providing user data throughput information to mobile subscribers; and for the communication network to support providing the user data throughput periodically or upon request by the mobile subscriber.

In general the mobile subscriber may define a frequency (via a send parameter) that the mobile subscriber would like to use to receive data throughput information from the network. This information may be stored in the subscriber database. For example, the mobile subscriber may specify that the data throughput information be sent on a per call basis or on a defined time interval basis. The system may also have a default reporting frequency; for example, daily if the subscriber does not provision the interval for throughput data delivery.

The send parameter may be one of a per call basis parameter (for example, send at the end of each packet data call), a time interval basis parameter (for example, every five minutes), an immediate request basis parameter (send now), and a communication network default basis parameter (for example, once per day).

The user of the mobile device may specify the send parameter by pressing pre-define function keys from the mobile screen or by dialing a service provider supplied special number for provisioning to enter the send parameter to the system. Once the system receives the send parameter associated with the mobile user, the data will be stored the subscriber database for the mobile user.

The data throughput information may be sent from the communication network to the mobile terminal via at least one of email, SMS, and data for display on the mobile terminal. Embodiments of the send parameter and the format for sending the data throughput information may take many different forms in various embodiments of the present method and system.

Figure 1:
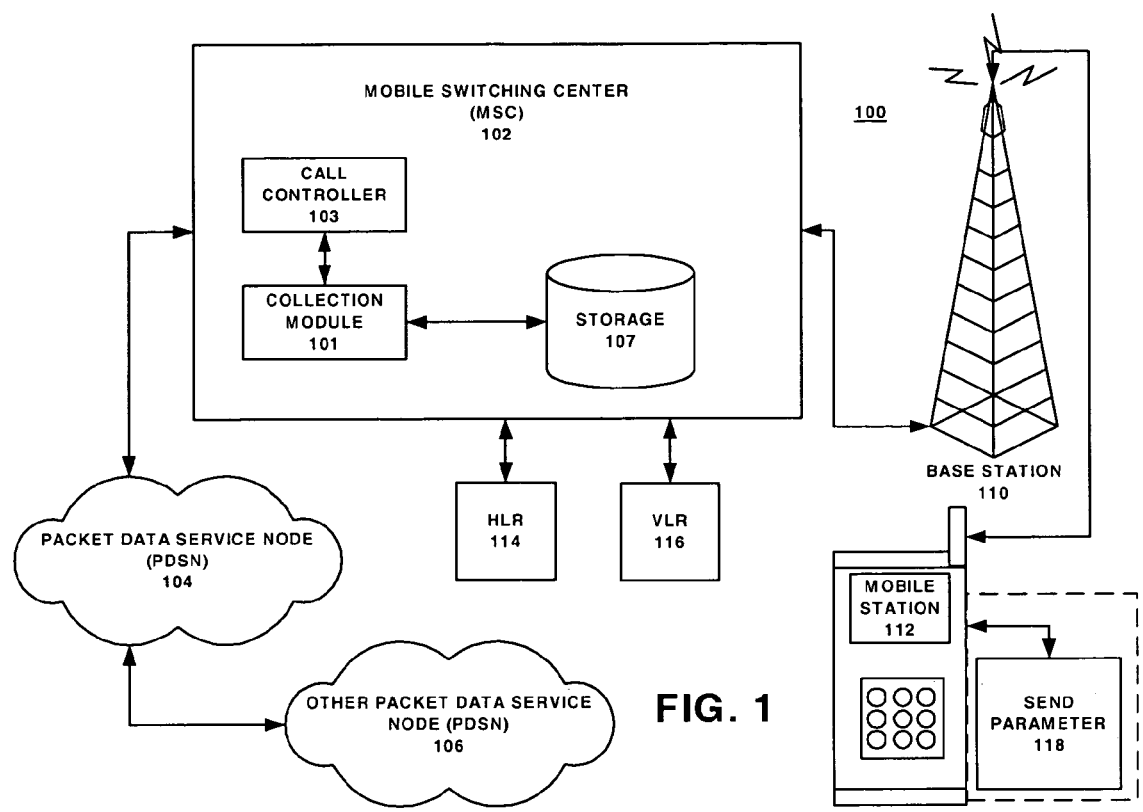
FIG. 1 depicts a block diagram illustrative of a mobile switching center, base station and mobile terminal for use with the present method and system.

Referring to FIG. 1, a system 100 is depicted for at least one mobile terminal of a plurality of mobile terminals operatively connected to a communication network. Although the present system and method may be used any type of system (wired and wireless, for example), the subscriber may typically be a mobile subscriber who uses a mobile terminal (also referred to as mobile phone, a cell phone, mobile handset, car phone). The system (or communication network) 100 may have a mobile switching center (MSC) 102. The system may be, or may be part of, one or more of a telephone network, a local area network ("LAN"), the Internet, and a wireless network. In the depicted embodiment, a packet data service node (PDAN) 104 is connected to the MSC 102. The PDSN 104 routes calls to and from mobile users through the MSC 102. The PDSN 104 also routes calls from and to other packet data network 106. The MSC 102 may also be connected to one or more base stations (BS) 110. Each of the base stations 110 communicates with mobile terminal(s) 112 in its service area. The PDSN 104 generally can be implemented as the worldwide packet data IP network accessible to all those with packet data access privileges.

Each of the mobile terminals 112 may have a home location register (HLR) 114 where data about each of the mobile terminals 112 resides. Some of the mobile terminals 112 may be remotely located from their home location, and in that case, a visiting location register (VLR) 116 is set up locally for each mobile terminal 112 that is visiting in its service area. HLR 114 can be implemented as a permanent SS7 database utilized in cellular networks, such as, but not limited to, for example, AMPS (Advanced Mobile Phone System), GSM (Global System for Mobile Communications), and PCS.

HLR 114 may be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile terminal 112 may be implemented as a cellular device, personal communication device, short message service device or wireless communications device (e.g., a wireless personal digital assistant).

The MCS 102 may have, or be operatively connected to, components of a system for at least one mobile terminal of a plurality of mobile terminals operatively connected to a communication network (for example, collection module 101, call controller 103 and storage 107 in the MCS 102; and send parameter 118 that is formed in the mobile terminal 112).

Figure 2:
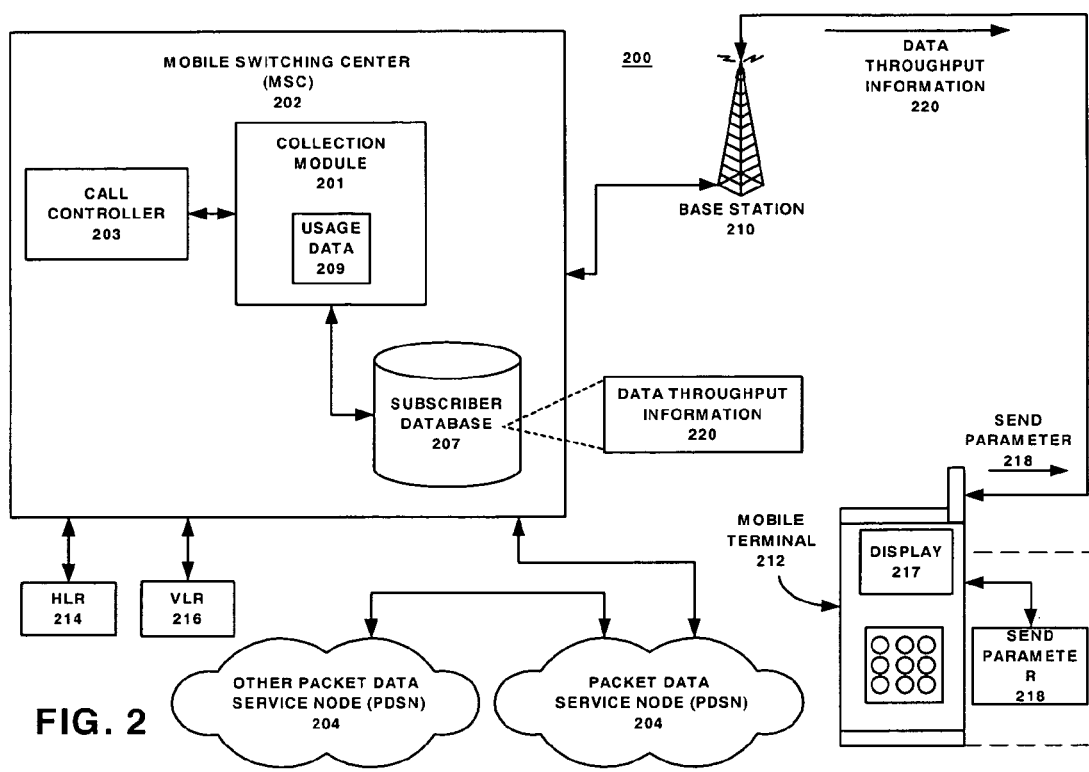
FIG. 2 illustrates a more detailed block diagram illustrative of a mobile switching center, base station, and mobile terminal according to one embodiment of the present method and system.

Referring to FIG. 2, a system (or communication network) 200 is shown for at least one mobile terminal of a plurality of mobile terminals operatively connected to a communication network. FIG. 2 depicts a block diagram that is illustrative of a mobile switching center 202 operatively connected to PDSN 204, base station 210, and mobile terminal 212 according to one embodiment of the present method and system. The PDSN 204 routes packet data calls to and from mobile users through the MSC 202, and also routes packet data calls from and to other packet data network 206. The MSC 202 is connected to one or more base stations 210. The base station(s) 210 communicates through the air to mobile terminals 212, which may be of a cellular telephone type or of the wider bandwidth personal communication device type. Mobile terminals 212 may be wireless handsets or automobile mounted stations the same as those shown in FIG. 1. The MSC 202 has operatively connected thereto a VLR 216 and a HLR 214 that interface with the mobile terminal 212 as explained above.

One embodiment of the system for at least one mobile terminal of a plurality of mobile terminals operatively connected to a communication network may have the following elements.

At least one send parameter 218 is defined by a respective mobile terminal 212 of a plurality of mobile terminals. The send parameter 218 is communicated from the respective mobile terminal to the communication network 100. As depicted in FIG. 2, the send parameter 218 may be forwarded to the mobile switching center 202 by the base station 210. In the mobile switching center 202 a call controller 203 is operatively connected to a collection module 201. The collection module 201 is also operatively connected to a subscriber database 207.

For each of the packet data calls the mobile terminal 212 is either originating or receiving, the call controller module 203 will collect the packet data usage information, i.e. bytes transmitted, and bytes received, for the whole duration of the packet data call and at the end of the call, the usage data will be sent to the collection module 203 to be processed based on the send parameter 218 received from the mobile user. For example, if the send parameter 218 indicates the usage data to be sent to the mobile terminal 212 on a per call basis, then the aggregate usage data for each of the packet data calls associated with the mobile terminal will be sent to the mobile terminal 212 at the end of the call and the usage data for that mobile user will be reset afterward.

The collection module 201, in response to a received send parameter 218, collects respective usage data 209 associated with packet data calls for a respective mobile terminal, such as mobile terminal 212. The collection module 201 then forms respective data throughput information 220 from the usage data 209. The respective data throughput information 220 may be stored in storage, such as subscriber database 207. The respective data throughput information 220 is sent from the communication network 200 to the mobile terminal 212 as a function of the send parameter 218. At the mobile terminal 212 the data throughput information 220 may be displayed on display 217.

Some embodiments of the present method and system may be used to separate data activity for each mobile terminal of the plurality of mobile terminals into respective data usage, and to store in the subscriber database 207 respective data throughput information for each of the mobile terminals of the plurality of mobile terminals. Other systems and devices may be used to store the data throughput information.

The collection module in one embodiment may aggregate the respective data usage over a predetermined time interval and periodically update the respective data throughput information with the respective data usage. Such a time interval may be, for example, once every hour, once a day, or once a month.

The data throughput information 220 may be sent from the communication network 200 to the mobile terminal 212 via at least one of Email, SMS, and data for display on the mobile terminal. The data throughput information 220 may be periodically sent from the communication network 200 to the mobile terminal 212, or may be sent upon request by the mobile terminal 212. The usage data 209 may include but not limited to a number of items, such as bytes transmitted by the mobile terminal, bytes received by the mobile terminal 212, number of outgoing packet data sessions, and number of incoming packet data sessions, etc.

Figure 3:
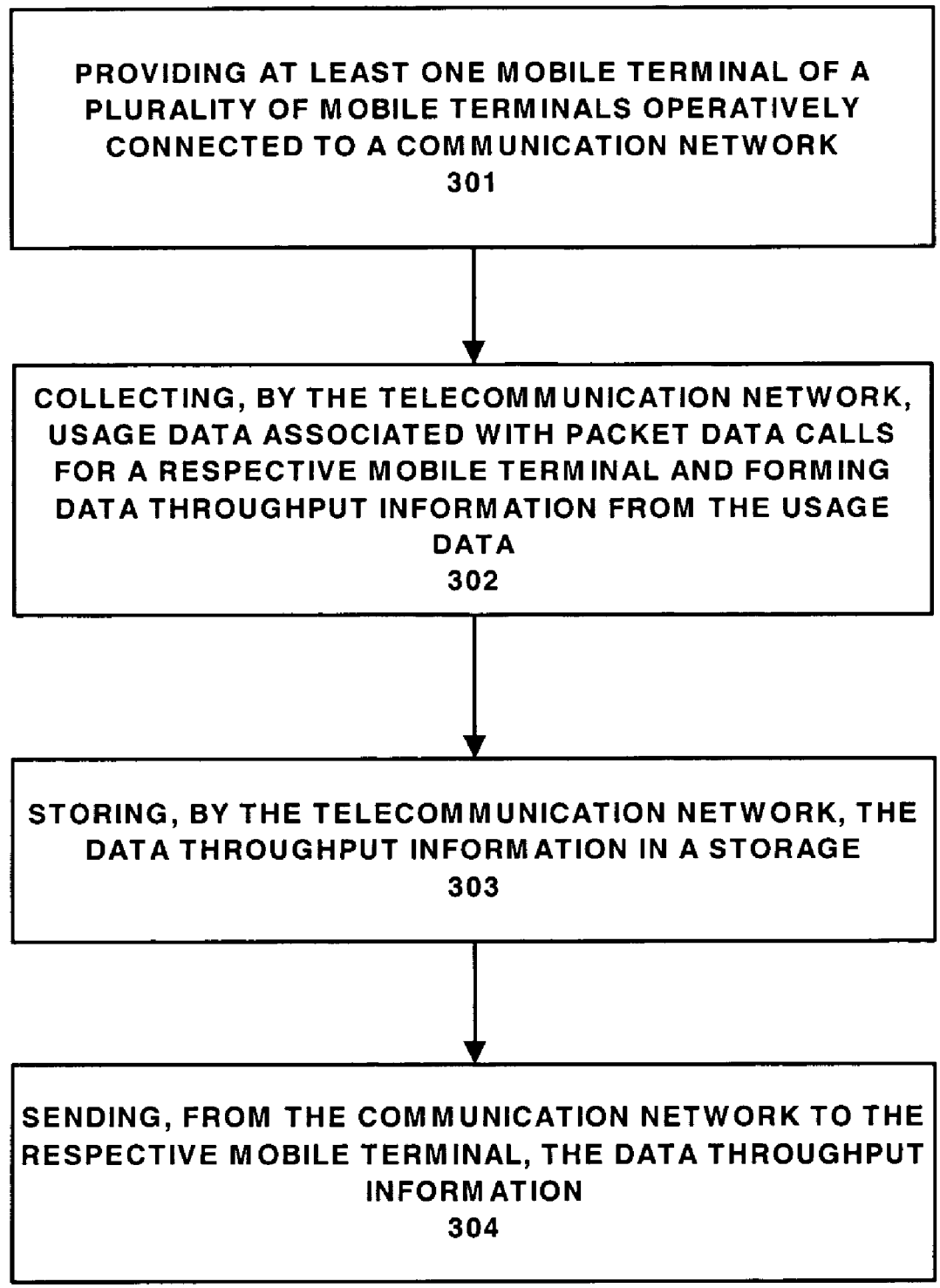
FIG. 3 illustrates a very general flow chart of logical operational steps that may be followed in accordance with one embodiment of the present method and system.

FIG. 3 is a block diagram depicting an embodiment of the present method. In very general terms, the method has the steps of: providing at least one mobile terminal of a plurality of mobile terminals operatively connected to a communication network (step 301); collecting, by the telecommunication network, usage data associated with packet data calls for a respective mobile terminal and forming data throughput information from the usage data (step 302); storing, by the telecommunication network, the data throughput information in a storage (step 303); and sending, from the communication network to the respective mobile terminal, the data throughput information (step 304).

Figure 4:
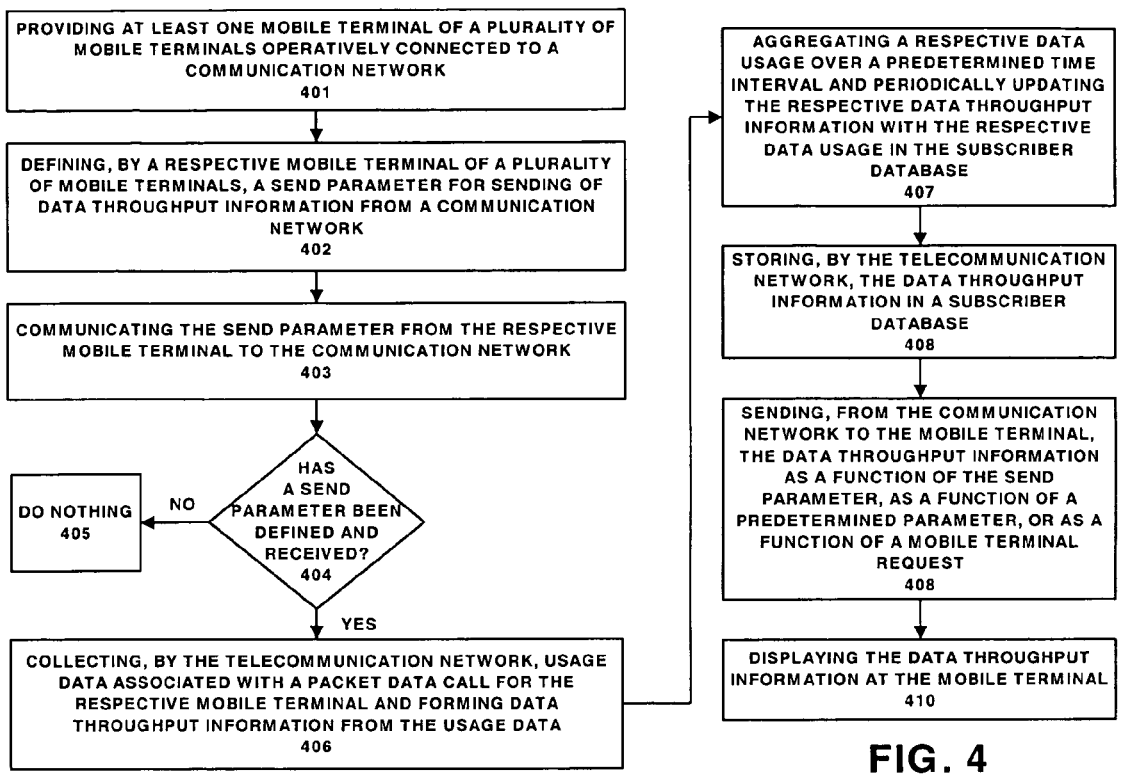
FIG. 4 illustrates another flow chart of logical operational steps that may be followed in accordance with one embodiment of the present method and system.

FIG. 4 is a block diagram depicting another embodiment of the present method. This embodiment of the method may have the steps of: providing at least one mobile terminal of a plurality of mobile terminals operatively connected to a communication network (step401); defining, by a respective mobile terminal of a plurality of mobile terminals, a send parameter for sending of data throughput information from a communication network (step 402); communicating the send parameter from the respective mobile terminal to the communication network (step 403); determining if a send parameter has been received at the communication network; if it has not been received, doing nothing (step 405); if it has been received, collecting, in response to the received send parameter, usage data associated with packet data calls for the respective mobile terminal and forming data throughput information from the usage data (step 406); aggregating a respective data usage over a predetermined time interval and periodically updating the respective data throughput information with the respective data usage in the subscriber database (step 407); storing, by the telecommunication network, the data throughput information in a subscriber database (step 408); sending, from the communication network to the mobile terminal, the data throughput information as a function of the send parameter (step 409); and displaying the data throughput information at the mobile terminal (step 410).

The present system and method may be used with non-mobile phones, as well as, mobile phones. Also, different types of data storage devices may be used with the present method and system. For example, a data storage device may be one or more of a magnetic, electrical, optical, biological, and atomic data storage medium.

The present invention overcomes the drawbacks of the prior art and provides an improved method and system in a telecommunications network for providing packet data throughput information on a per user basis for at least one mobile terminal of a plurality of mobile terminals operatively connected to a communication network.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method that provides packet data throughput information on a per user basis for at least one mobile terminal of a plurality of mobile terminals operatively connected to a communication network, the method comprising the steps of:

defining, by a respective mobile terminal of a plurality of mobile terminals, a send parameter for sending of data throughput information from a communication network;

communicating the send parameter from the respective mobile terminal to the communication network;

collecting in response to a received send parameter, by the telecommunication network, usage data associated with packet data calls for the respective mobile terminal and forming data throughput information from the usage data, the telecommunication network separating data activity among different users;

storing, by the telecommunication network, the data throughput information in a subscriber database; and sending, from the communication network to the mobile terminal, the data throughput information as a function of the send parameter, the data throughput information being sent from the communication network to the mobile terminal upon request by the mobile terminal.

2. The method of claim 1 wherein the send parameter is one of a per call basis parameter, a time interval basis parameter, an immediate request basis parameter and a communication network default basis parameter.

3. The method of claim 1 wherein the method further comprises separating data activity for each mobile terminal of the plurality of mobile terminals into respective data usage, and storing in the subscriber database respective data throughput information for each of the mobile terminals of the plurality of mobile terminals.

4. The method of claim 1 wherein the communication network aggregates a respective data usage over a predetermined time interval and periodically updates the respective data throughput information with the respective data usage.

5. The method of claim 1 wherein the data throughput information is sent from the communication network to the mobile terminal via at least one of email, SMS, and data for display on the mobile terminal.

6. The method of claim 1 wherein the data throughput information is periodically sent from the communication network to the mobile terminal.

7. The method of claim 1 wherein the usage data comprises at least one of bytes transmitted by the mobile terminal; bytes received by the mobile terminal, number of outgoing packet data sessions, and number of incoming packet data sessions.

8. A system that provides packet data throughput information on a per user basis for at least one mobile terminal of a plurality of mobile terminals operatively connected to a communication network, the system comprising:

at least one send parameter defined by a respective mobile terminal of a plurality of mobile terminals, the send parameter being communicated from the respective mobile terminal to the communication network;

collection module in the telecommunication network, the collection module collecting, in response to the send parameter, respective usage data associated with packet data calls for a respective mobile terminal and forming respective data throughput information from the usage data, data activity among different users being kept separately; and a storage in the telecommunication network, the respective data throughput information being stored in the storage;

wherein the respective data throughput information is sent from the communication network to the mobile terminal as a function of the send parameter, the data throughput information being sent from the communication network to the mobile terminal upon request by the mobile terminal.

9. The system of claim 8 wherein the send parameter is one of a per call basis parameter, a time interval basis parameter, an immediate request basis parameter and a communication network default basis parameter.

10. The system of claim 8 wherein the storage is a subscriber database, mid wherein respective data throughput information for each mobile terminal of the plurality of mobile terminals is stored in the subscriber database.

11. The system of claim 8 wherein the communication network aggregates the respective data usage over a predetermined time interval and periodically updates the respective data throughput information with the respective data usage.

12. The system of claim 8 wherein the data throughput information is sent from the communication network to the mobile terminal via at least one of email, SMS, and data for display on the mobile terminal.

13. The system of claim 8 wherein the data throughput information is periodically sent from the communication network to the mobile terminal.

14. The system of claim 1 wherein the usage data comprises at least one of bytes transmitted by the mobile terminal; bytes received by the mobile terminal, number of outgoing packet data sessions, and number of incoming packet data sessions.

* * * * *